UNITED STATES PATENT OFFICE.

DON ANGELO JERONE, OF FLORENCE, ITALY.

MOISTUREPROOF PAINT COMPOSITION.

1,401,261.  Specification of Letters Patent.  Patented Dec. 27, 1921.

No Drawing.  Application filed June 4, 1920. Serial No. 386,531.

*To all whom it may concern:*

Be it known that DON ANGELO JERONE, subject of King of Italy, residing at Florence, Toscana, Italy, have invented new and useful Improvements in Moistureproof Paint Composition, of which the following is a specification.

The present invention relates to a moistureproof paint composition and process of applying the same, by means of which said composition will so impregnate the surface upon which it is applied that such surface will be rendered impervious to moisture.

The following is an example of the ingredients of the composition and the manner in which they are combined. Pure wax, preferably in the form of bees' wax, free from all foreign substances, is mixed with essence of turpentine, and a raw pigment of the desired color incorporated in the solution, the proportions of wax and turpentine varying according to the color used. To the mixture is then added a small proportion of propolis.

The surface to be protected is painted with the composition above described, and is then subjected to a gentle heat from a suitable source of heat from which no smoke is emitted, such for instance as an oxy-hydrogen flame or a benzene lamp.

I have discovered that a composition of the ingredients above-stated applied in the manner set forth, not only imparts the quality of imperviousness to dry surfaces, but when applied to a surface which has already been attacked by moisture the surface becomes so insulated that it is immune against any further attack.

Moreover, the composition greatly enhances the beauty of the pigment coloring and preserves it against deterioration irrespective of atmospheric influences.

It is of course obvious that the composition may be applied to wall surfaces of any description, and in some cases may be desirable to manipulate the composition so as to render it perfectly smooth.

Having thus described my invention, what I claim is:

1. A moisture-proof paint composition, comprising a mixture of wax, turpentine and propolis.

2. A moisture-proof paint composition, comprising a mixture of bees' wax, turpentine, propolis, and a raw pigment.

In testimony whereof I have signed my name to this specification.

DON ANGELO JERONE.

Witnesses:
CAMILLO BRUNO MANNUCCI,
ISABELLE KIRCH.